United States Patent [19]
Uchida

[11] Patent Number: 5,185,565
[45] Date of Patent: Feb. 9, 1993

[54] CHARGE CONTROL APPARATUS FOR USE WITH ELECTRONIC EQUIPMENT

[75] Inventor: Zenjiro Uchida, Ashikaga, Japan

[73] Assignee: Sanyo Electric Co., Ltd., Osaka, Japan

[21] Appl. No.: 766,742

[22] Filed: Sep. 27, 1991

[30] Foreign Application Priority Data

Oct. 1, 1990 [JP] Japan .................................. 2-264710
Nov. 14, 1990 [JP] Japan .................................. 2-309421

[51] Int. Cl.⁵ .............................................. H02J 7/04
[52] U.S. Cl. ...................................... 320/39; 320/27; 320/30
[58] Field of Search ...................... 320/39, 30, 20, 43, 320/27

[56] References Cited

U.S. PATENT DOCUMENTS 4,792,743 12/1988 Tsujino et al. ........................ 320/15
4,845,419 7/1989 Hacker ................................. 320/39
5,049,804 9/1991 Hutchings ............................ 320/20
5,055,763 10/1991 Johnson et al. ...................... 320/15

FOREIGN PATENT DOCUMENTS 124731 5/1988 Japan .
166441 11/1989 Japan .

Primary Examiner—Steven L. Stephan
Assistant Examiner—Matthew Nguyen
Attorney, Agent, or Firm—Spensley Horn Jubas & Lubitz

[57] ABSTRACT

Apparatus for effecting a control such that quick charge is automatically effected when electronic equipment is not used with its power switch off. Particularly, the quick charge is automatically effected when a battery is replaced or when an adapter is connected to the main unit of the equipment. Simply turning on the power switch does not lead the start of quick charge in order to prevent the overcharge of battery.

9 Claims, 11 Drawing Sheets

CHARGE CONTROL APPARATUS FOR USE WITH ELECTRONIC EQUIPMENT

BACKGROUND OF THE INVENTION

1. Field of the Invention

This invention relates to a charge control apparatus for effecting quick charge of secondary battery such as a Nickel-Cadmium (Ni-Cd) battery for use with electronic equipment, for instance, a personal computer.

2. Description of the Related Art

Most of electronic equipment such as a laptop computer or a note book type computer handy to carry require a rechargeable battery such as the Ni-Cd battery as a power source.

Heretofore, as disclosed in Japanese Patent Publication Laid-open No. 124731/1988, and Japanese Utility Model Publication Laid-open No. 166441/1989, this type of existing electronic equipment has employed a technique such that a quick charge is effected when the main unit of the electronic equipment is not active by having made a judgement of the condition of the equipment. In practice, the ON-OFF status of power switch is detected, and a quick charge is commenced when the switch is changed from ON to OFF.

In such a conventional apparatus, since the quick charge is necessarily commenced with the switching of the power switch from ON to OFF, quick recharge is effected even when a fully charged battery is situated in the charger, thereby shortening the life of battery due to overcharge.

SUMMARY OF THE INVENTION

It is an object of this invention to commence quick charge automatically when necessary, namely, when an adaptor is connected to a main unit of electronic equipment after a battery has been changed.

According to one aspect of this invention, there is provided a charge control apparatus for use with electronic equipment comprising:
- a power switch provided on the main unit of electronic equipment;
- a secondary battery situated in a removable fashion in the main unit of electronic equipment;
- a charging circuit for supplying a charging current for quick charge use to the secondary battery by the use of an external power source;
- first detector means for detecting the ON-OFF status of the power switch;
- second detector means for detecting the situated status of the secondary battery;
- identifying means for recognizing the completion of quick charge;
- flag control means for receiving signals from the second and third detector means, and causing a charge inhibition flag to be set when the quick charge is completed and to be reset when the secondary battery is removed; and
- charge control means for controlling the charging circuit dependent on the output of the first and the second detector means and the status of the charge inhibition flag, and the charge control means controlling the charging circuit in such manner as to commence the quick charge with the secondary battery being situated, the power switch off, and the charge inhibition flag being reset.

According to this invention, once the battery is charged, the charge inhibition flag enters a set state. Therefore, even if a fully charged battery is situated in the main unit of the equipment when the power switch is turned off, the recharging of this charged battery is not performed, thereby preventing the occurrence of over charge.

More preferably, since the charge inhibition flag is reset when the battery is removed, the quick charge of a battery newly situated is ensured.

The second detector means may consist of means capable of detecting a voltage at the output side of the charging circuit, comparing the voltage with a predetermined value, and recognizing whether or not the secondary battery is situated on the basis of the result of the comparison.

The identifying means supervises a voltage of the secondary battery, and detects a drop in the voltage by a predetermined value from a maximum value.

According to another aspect of this invention, there may be further provided third detector means for detecting the status of connection between the adaptor and the main unit of electronic equipment. With such an identifying means, the flag control means receives a signal from the third detector means and causes the charge inhibition flag to be set when the quick charge is completed and to be reset when the adaptor is removed from the main unit of electronic equipment. The charge control means controls the charging circuit dependent on the output of the first, second, and third detector means and the status of the charge inhibition flag. The charge control circuit effects the control in such a manner as to commence the charge with the secondary battery being situated, the power switch off, and the charge inhibition flag being reset.

As a result, after the battery has been fully charged, if the adaptor is connected to the main unit after the main unit has been used by the use of the drive of the battery with the adaptor removed from the main unit, automatic charge will be performed, and the charge control can be executed with high efficiency.

As with the second detector means, the third detector means is composed of a single comparator means for detecting the voltage at the output side of the charging circuit and comparing the voltage with a predetermined value, and detects the removal of the secondary battery and the disconnection of the adaptor from the electronic equipment dependent on the result of the comparison from the comparator means.

The charging circuit is provided in the same block where the adaptor is situated.

The charging circuit may further be provided with a switch for switching between the supply of power to the main unit of the electronic equipment by way of the adaptor and the supply of the quick charging current from the charging circuit, and the charge control circuit controls the switching operation of this switch.

The charging circuit may be provided with a trickle charging means for supplying a micro current to the secondary battery, and the trickle charging means supplies a micro current to the secondary battery means with the adaptor supplying power to the main unit of electronic equipment.

Both the organization and operation of this invention, together with further objects and advantages thereof may best be appreciated by reference to the following detailed description taken in conjunction with the accompanying drawings.

DETAILED DESCRIPTION OF THE INVENTION

Figure 2A:
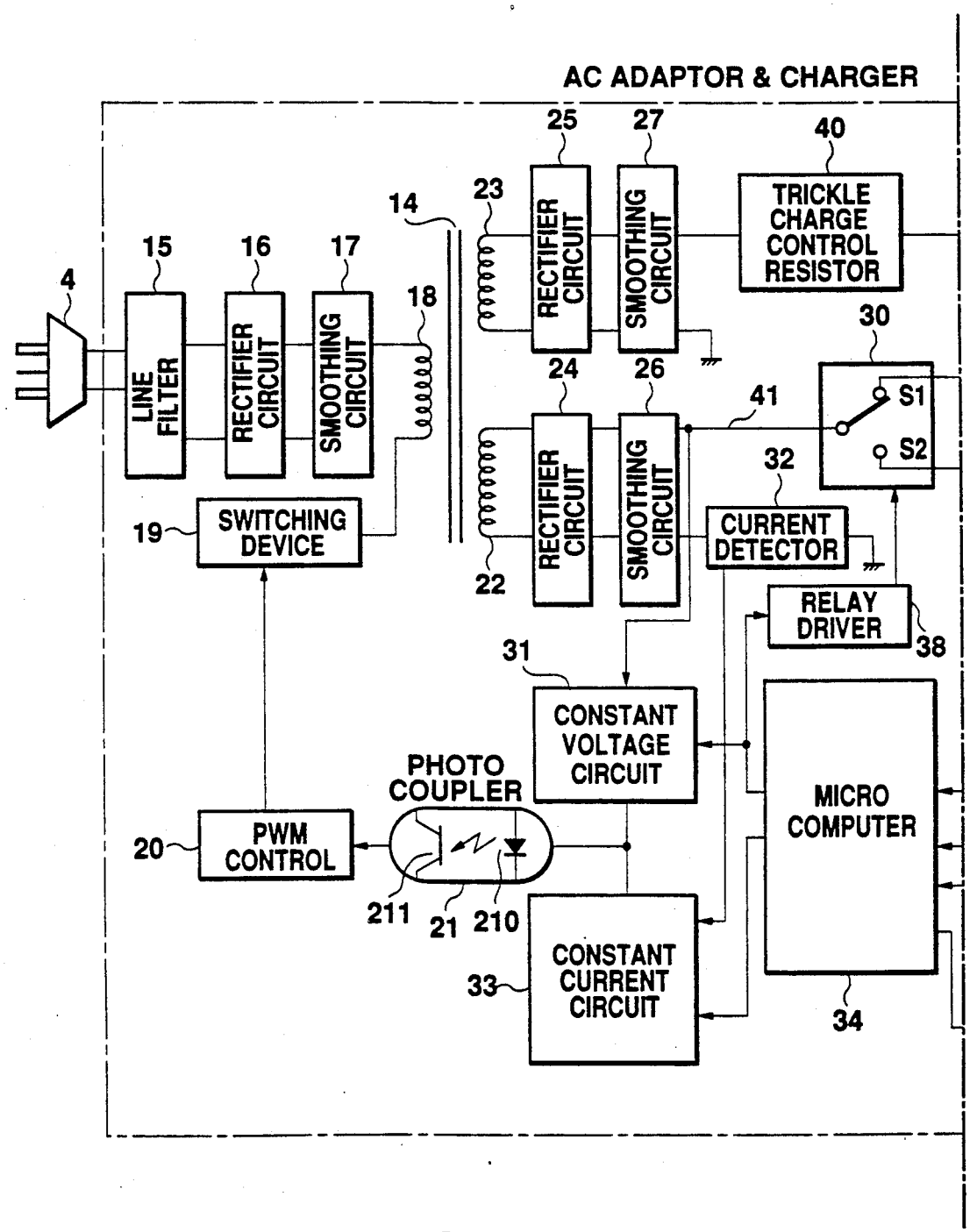
FIG. 2 is a schematic block diagram of the quick charge control apparatus according to one embodiment of this invention.
Figure 2B:
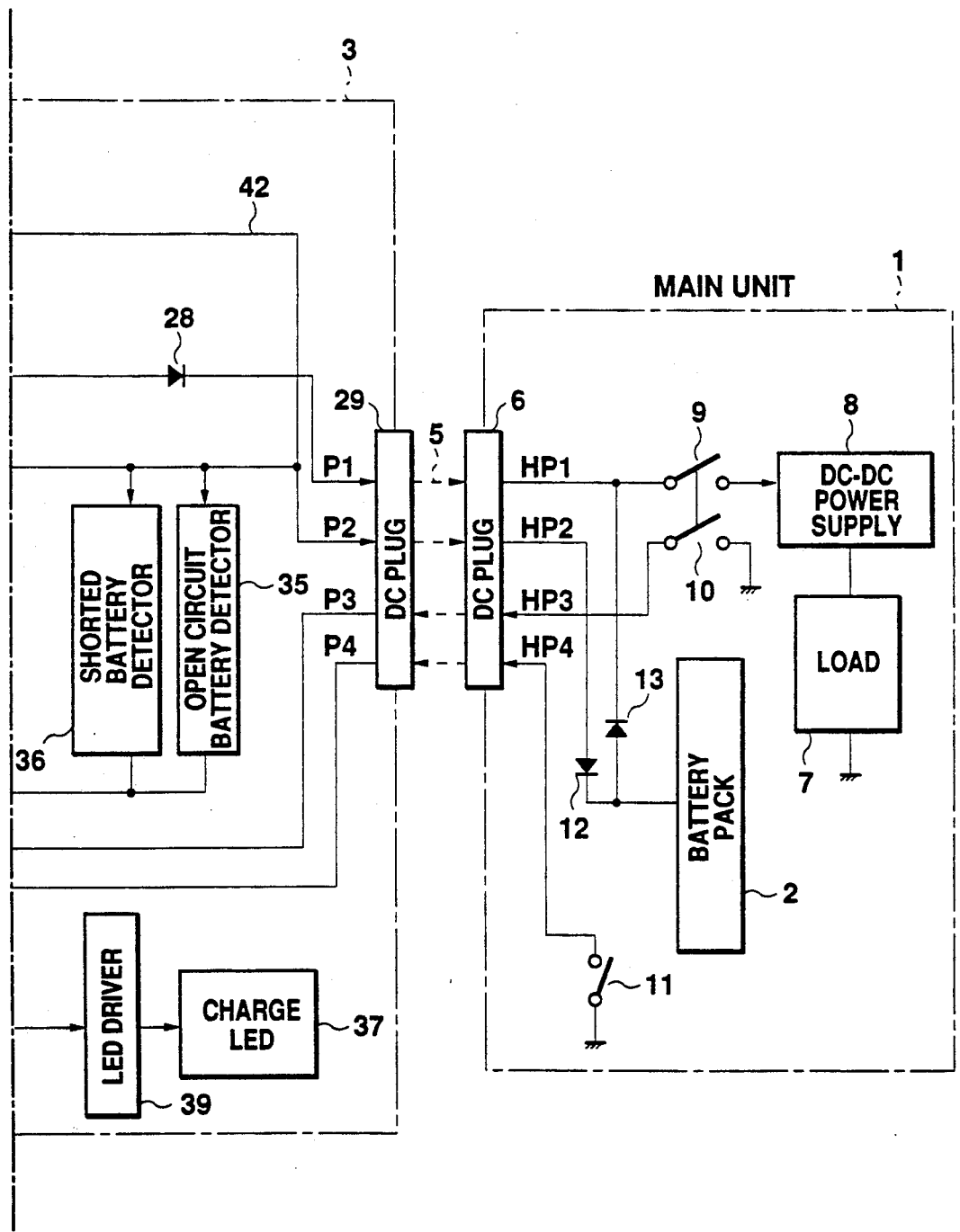

FIG. 2 of the accompanying drawings is a block diagram showing the schematic structure of a quick charge control apparatus according to one embodiment of this invention. A main unit 1 of a data processor such as a personal computer is provided with two removable battery packs consisting of, for example, a Ni-Cd secondary battery or a Ni-MH secondary battery. One terminal of an AC adaptor/charger 3 is connected to an AC plug 4, and the other terminal of the AC adaptor/charger is connected to the main unit 1 via a cable 5. The AC adaptor/charger has a dual function, namely, an AC adaptor function of converting an a.c. voltage into a d.c. voltage for supplying to the main unit and a charger function of effecting charge of the battery pack 2.

The main unit is comprised of a DC plug 6 for connecting between the main unit and the cable 5, a main unit power circuit 8 for supplying a voltage to a load 7 after having performed DC/DC conversion of the source voltage, a power switch 9 placed along a power supply line, a quick charge detector switch 10 for detecting ON/OFF status of the power switch 9, a switch 11 for identifying the type of a battery, a diode 12 connected to allow current flow from a terminal HP2 of the DC plug 6 to an input/output terminal of the battery pack 2, and a diode 13 connected to allow current flow from the input/output terminal of the battery pack 2 to a terminal HP1 of the DC plug 6.

At the primary side of a power transformer 14 of the AC adaptor/charger 3, there are provided a line filter 15, a rectifier circuit 16, a smoothing circuit 17, a primary coil 18, a switching element 19, a PWM control circuit 20 for controlling the ON-OFF operation of the switching element, and a photo transistor 211 which acts as the receiving portion of a photo coupler 21.

At the secondary side of the transformer, there are provided first and second coils 22 and 23, a rectifier circuit 24 and a smoothing circuit 26 in pair, and a rectifier circuit 25 and a smoothing circuit 27 in pair are connected to the coils 22 and 23, respectively. The output of the smoothing circuit 26 is selectively connected to either a terminal P1 of a DC plug 29 via a contact point S1 of a relay 30 or a terminal P2 of the DC plug 29 via a contact point S2 of the relay 30.

Moreover, the output terminal of the smoothing circuit 26 is connected to a constant voltage circuit 31 and a current detector circuit 32. The output terminal of the constant voltage circuit 31 is connected to a constant current circuit 33 and a photo diode 210 of the photo coupler 21 in order to secure the constant voltage and current of the power source. The control of the constant voltage circuit 31 and the constant current circuit 33 is executed under the control of a microcomputer 34. At the microcomputer 34 are inputted switching outputs of a quick charge detector switch 10 and a battery type changeover switch 11 placed on the main unit through terminals P3, P4 of the DC plug 29 and detecting signals of an open circuit battery/$-\Delta V$ detector circuit 35 and a short circuit battery detector circuit 36. A driver 38 of the relay 30 and a driver 39 of an LED 37 are controlled by the microcomputer 34.

The other output of the smoothing circuit 27 on the secondary side is connected to a trickle charge control resistor 40 for supplying a trickle charging current to the battery pack 2 through the terminal P2 of the DC plug 29.

In this embodiment, the trickle charging current Ir is set to 150 mA with less than 0.1 C where 1 C is the charge of a battery, by a 1 A current, which has a capacity of discharging a 1 A current for one hour when fully charged, and the voltage of a supply line 42 becomes 23 V when the battery is open circuit due to the absence of a battery. When in the adaptor mode, the contact point of the relay 30 is turned to the switch S1, and a 16 V constant voltage is supplied over the supply line 41. In the meantime, when in the quick charge mode, a contact point of the relay 30 is turned to the switch S2, a 23 V constant voltage is supplied over the supply line 42, and the value of the constant current is increased in steps with the elapse of time, as will be discussed later.

Figure 3A:
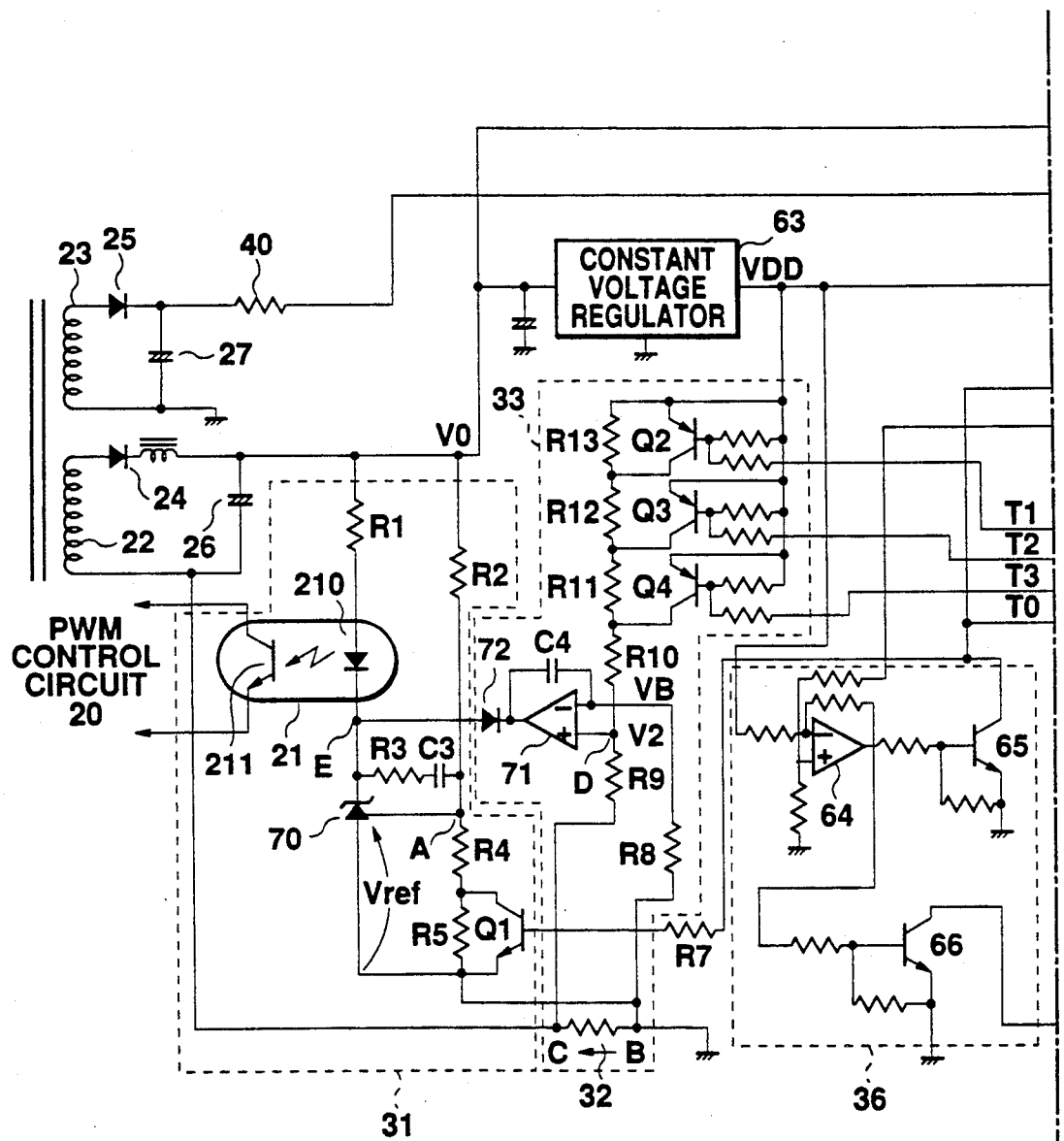
FIG. 3 is a detailed circuit diagram of the quick charge control apparatus according to one embodiment of this invention.
Figure 3B:
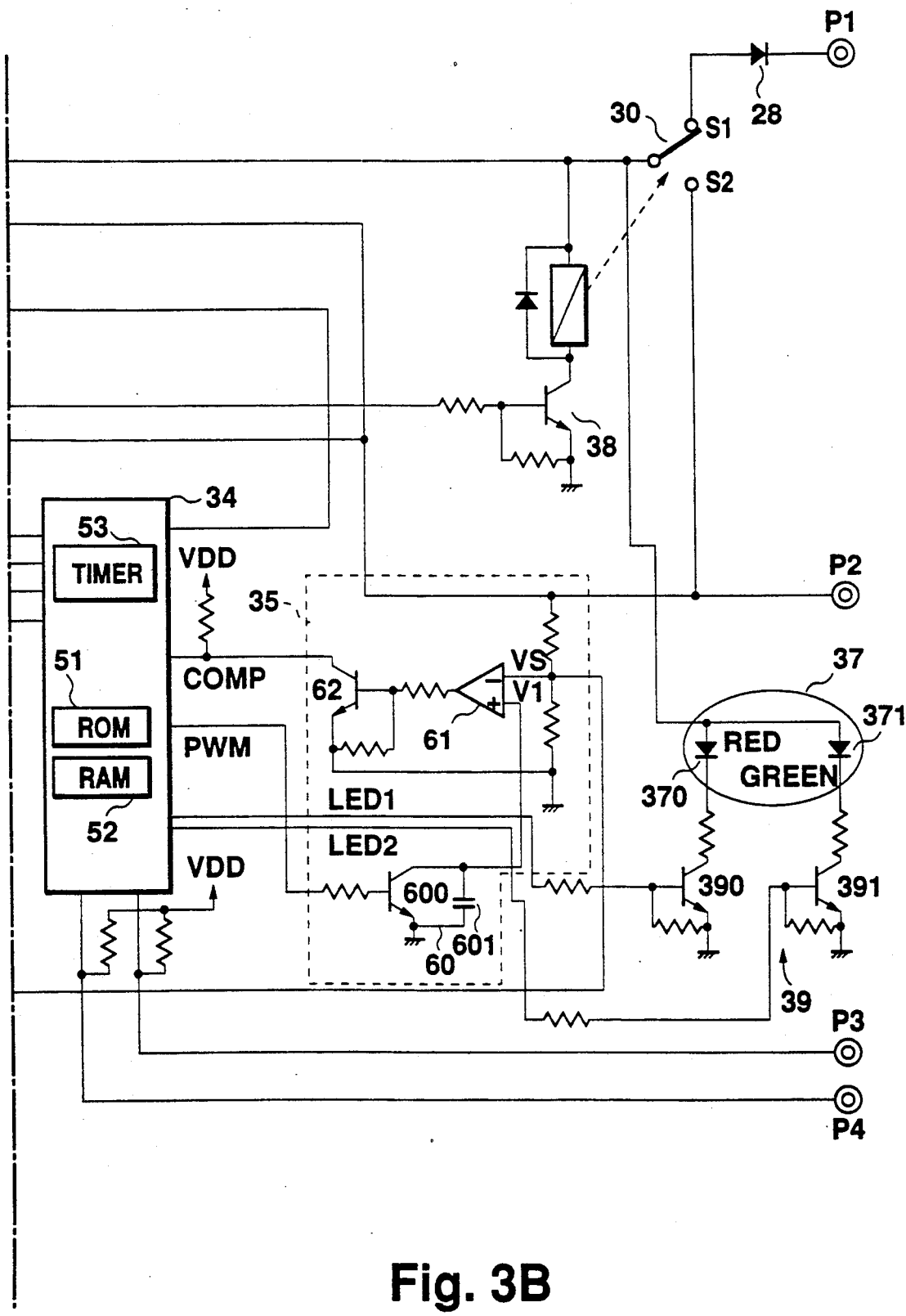

FIG. 3 shows a specific structure of the AC adaptor/charger 3, and detailed description will be given thereof.

The microcomputer 34 is comprised of a ROM 51 for storing a program and each $\Delta V$ value of the Ni-Cd battery and the Ni-MH battery, a RAM 52 for storing a voltage BV which is detected in response to the input from the COMP terminal, a peak voltage PEEK of the input voltage BV, several types of flags, that is, INF, SHORTF, BATF, and DELTA for use in controlling the charge, as will be described later, and a timer 53 including a safety timer, a short timer and a charge timer, and a $-\Delta V$.

The open circuit battery/$-\Delta V$ detector circuit 35 is comprised of a sawtooth waveform voltage generator circuit 60 composed of a capacitor 601 and a transistor 600 for outputting a reference voltage V1 of a sawtooth waveform in response to a pulse signal PWM whose pulse width is modulated in such a manner as to increase a duty ratio sequential from the microcomputer 34, a comparator 61 for comparing the sawtooth waveform reference voltage V1 with a resistance divided voltage Vs of the line 42, and a transistor 62 which is turned on and off in response to the output from the comparator 61 for inputting the same output to the COMP terminal. The open circuit battery/$-\Delta V$ detector circuit 35 delivers a signal representative of a result of the comparison between the resistance divided voltage Vs and the reference voltage V1 to the COMP terminal.

Here, the voltage Vs is set to be nearly equivalent to a maximum value of the reference voltage V1 when the voltage of the line 42 is 22 V, and minimum value of the V1 is 0 V. As a result, when the DC plug 29 is disconnected from the DC plug 5, or when the battery is open circuit due to the absence of the battery, the voltage of the line 42 constantly exceeds the 23 V and 22 V, and hence a high signal is continuously fed to the COMP terminal. When the DC plug 29 is connected to the DC plug 5, and the battery is situated in the holder, the voltage of the line 42 drops to the battery voltage, and hence the input signal to the potential of the COMP terminal is changed between positive and negative in accordance with variations in the reference voltage V1. Consequently, the microcomputer can recognize whether or not the DC plug 29 is connected, or whether the battery is open circuit or not.

Further, where the potential of the input signal to the COMP terminal is inverted between positive and negative is a level where the reference voltage V1 having been increased from 0 V becomes equivalent to the voltage Vs. Therefore, the voltage of the line 41 can be known from a corresponding reference voltage V1. In addition, since the reference voltage V1 is determined by the pulse signal PWM, the microcomputer 34 can recognize the voltage of the line 42, that is, the battery voltage from the signal PWM when the potential of an input signal to the COMP terminal is inverted.

The open battery/$-\Delta V$ detector circuit may recognize the voltage of the line 42 by converting the voltage directly or by dividing the resistance, and then effecting analog-to-digital conversion of the once converted voltage.

The shorted battery detector circuit 36 is comprised of a comparator 64 for detecting a drop in the voltage of the line 42 less than 10 V, and transistors 65 and 66 which are turned on and off dependent on the output from the comparator 64. The transistor 65 is connected to the relay driver 38, and the transistor 66 is connected to the negative terminal of the comparator 61.

The constant voltage circuit 31 and the constant current circuit 33 will now be described hereinbelow.

The constant voltage circuit 31 is comprised of the resistor R1, the photodiode 210, and the shunt regulator in series, and the series resistors R2, R4, R5 having a voltage dividing junction A connected to the Vref terminal of the shunt regulator 70. The Vref voltage of the shunt regulator 70 is always constant, and a value of the resistors is changed so as to maintain the voltage at the juncture A at constant. R3 and C3 are components to prevent oscillation.

A transistor Q1 is connected in parallel with the resistor R5, and at the base of the transistor Q1 is inputted a signal T0 from the microcomputer 34 via the resistor R7.

With such a structure, the rise or the drop in the voltage V0 of the line 42 results in the increase or the decrease of the current flowing to the photodiode 210 due to variations in the amount of currents flowing through the shunt regulator 70 caused by a change in the potential at the juncture A, or the Vref, and the current flowing into the photodiode is fed back to the PWM control circuit 20 by means of a phototransistor 211. The PWM control circuit 20 operates in such a manner that a switching element 19 is turned on and off so as to cause the voltage V0 to be decreased or increased in order to maintain the voltage V0 at constant.

Since $$V0 = \{1 + R2/(R4 + R5)\} Vref.$$

(R4+R5) is limited only to R4 when the transistor Q1 is ON. Since the Vref is always constant, the voltage V0 becomes high. In this embodiment, the voltage V0 is changed from 16 V to 25 V by turning the transistor Q1 off.

The constant current circuit 33 is comprised of series resistors R13, R12, R11, R10, R9 connected between the terminal C of a current detector resistor 32 for detecting a charging current supplied to the battery and the output terminal of the constant voltage regulator 63, a comparator 71 having a positive terminal connected to a voltage dividing juncture D of the series resistors and a negative terminal connected to the terminal B of the current detector resistor 32 via a resistor 8, a diode 72 connected between a juncture E, which is interposed between the photodiode 70 and the cathode of the shunt regulator 70, and the output terminal of the comparator 71 in such a fashion as to allow current flow, and transistors Q2, Q3, Q4 connected in parallel with the series resistors R13, R12, R11, and at each base of which is inputted each signal T1, T2, and T3.

In this circuit, when effecting quick charge of the battery pack 2 situated in the battery holder, a current flows from the line 41 in a direction designated by an arrow to the current detector resistor 32 via the battery pack 2. A rise or drop in this current causes an increase or a decrease in the output of the comparator 71. In response to this variation, the amount of current flowing through the photodiode 210 via the diode 72 is also decreased or increased. This current flow is fed back, and acts so as to decrement or increment the current flowing through the current detector resistor 32, consequently maintaining the current at constant.

When the signals T1, T2, and T3 are changed from H to L, the transistors Q2, Q3, Q4 are turned on to cause the resistors R13, R12, and R11 to be short-circuited, thereby increasing the reference voltage at the juncture D which is the positive terminal of the comparator. Hence, the value of the constant current flowing in the current detector resistor 32 is increased. In practice, corresponding to the signals T1, T2, and T3, the value of the constant current is changed, for instance, 1A=0.6 C, 1.7A=1 C, and 2.5A=1.5 C in steps. At this time, if all signals T0 to T3 are high, the value of the constant current is selected to be 3A=0.2 C.

In the embodiment, two types of battery, that is, the Ni-Cd battery and the Ni-MH battery can be used and each type is recognized by its own characteristic structure as shown in FIG. 5.

Figure 5A:
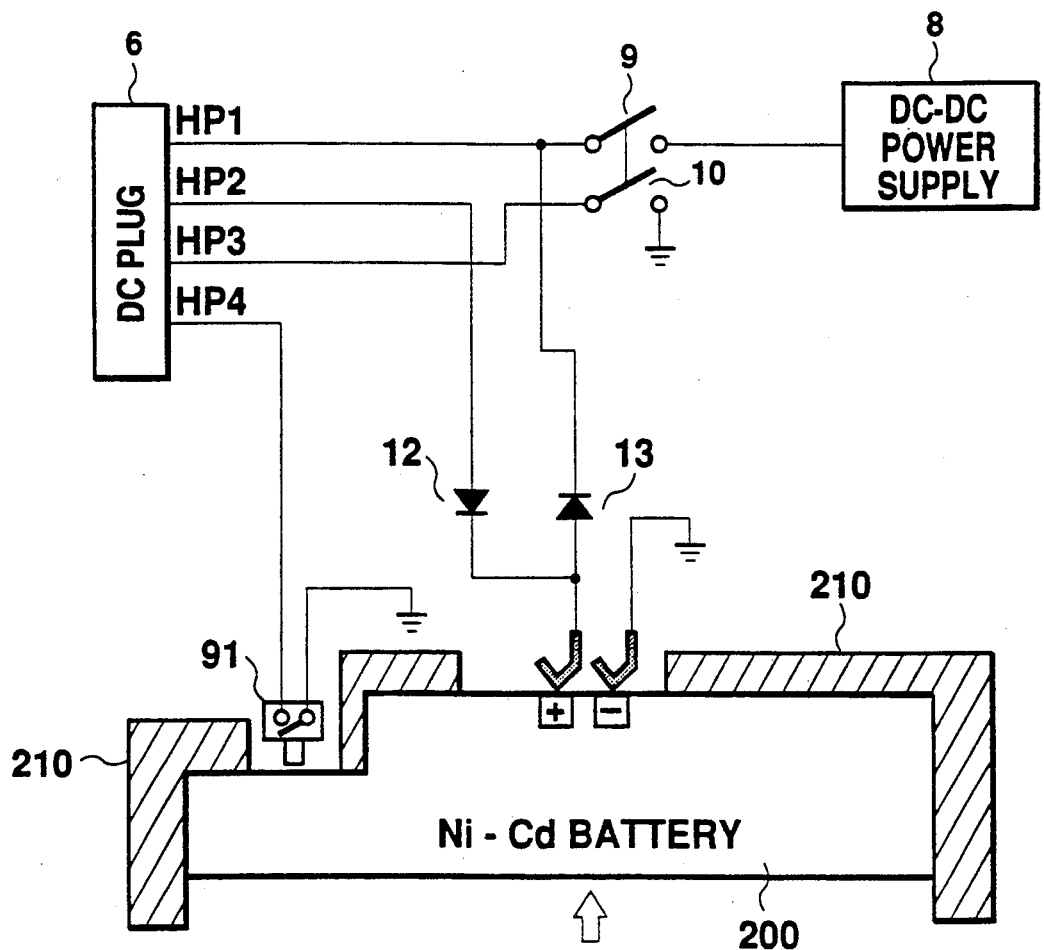
FIG. 5 is a schematic representation of the main structure of the quick charge control apparatus according to one embodiment of this invention.
Figure 5B:
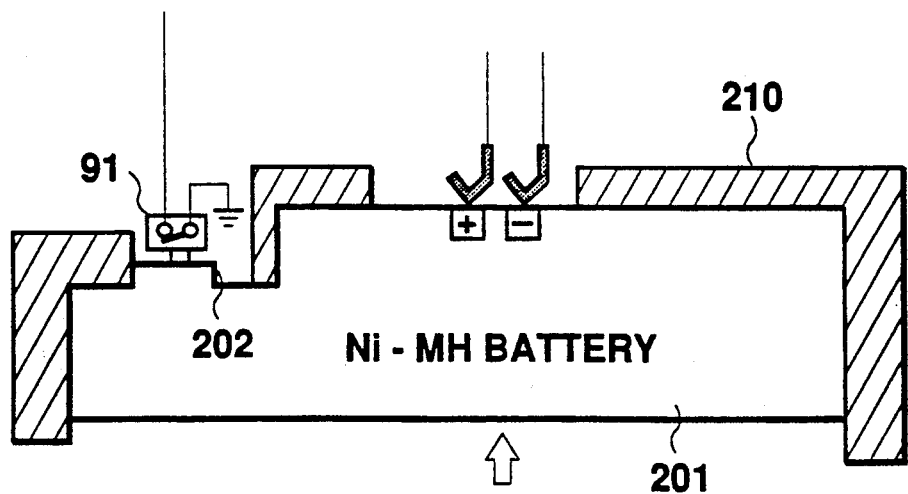

Specifically, a microswitch 91 is provided at the holder portion of the battery pack. In the case of the Ni-Cd battery 200, as illustrated in FIG. 5A, the battery has no protruding portion which presses the switch 91, but in the case of the Ni-MH battery 201, the battery has a protruding portion as illustrated in FIG. 5B at the position corresponding to the switch.

When the Ni-Cd battery 200 is situated in the holder 210 provided on the main unit as designated by an arrow, the switch 91 is out of contact with the battery 200, so that the switch 91 is remained off. However, when the Ni-MH battery 201 is situated in the holder, the protruding portion 202 presses the switch 91 to turn on. The output about the ON-OFF operation of the switch 91 is then fed to the microcomputer 34 by way of the HP4 and P4 of the DC plug. The switch 91 may be manually operated.

Again referring to FIG. 3, an LED 37 is composed of a red LED 370 and a green LED 371, and an LED driver 39 is made up of two transistors 390 and 391.

With reference to the flow chart of FIG. 1 and the waveform of FIG. 4, the operation of the charge control apparatus according to this invention will be described in detail hereunder.

When an AC plug 4 is plugged in a power outlet, the AC adapter/charger 3 is reset to be turned on, and the internal state thereof is refreshed. Then the microcomputer 34 changes the signal T0 to be low. As the result of this, the transistor 38 is turned off, and the relay 30 makes a contact with a contact S1, and hence the AC adaptor/charger 3 enters the adaptor mode for supplying a 16 V constant voltage from the line 41 to the plug terminal P1 because the transistor Q1 is OFF. When in this mode, with the battery being situated in the holder, a trickle charging current below 0.1 C is supplied to the battery pack 2 from the line 42 through the coil 23, the rectifier circuit 25, the smoothing circuit 27, the trickle charge control resistor 40, and the terminal P2.

As shown in the flow chart of FIG. 1, the microcomputer 34 judges whether or not the DC plug 29 of the AC adapter/charger 3 is connected to the DC plug 6 on the main unit 1 on the basis of the input to the terminal COMP, and whether or not the battery is open circuit. If the connection of the DC plug 6 is established, and if the battery 2 is situated in the holder, the ON-OFF status of the power switch 9 on the main until 1 is judged. If the state of the power switch is judged as being ON, it will be checked whether or not the internal inhibition flag is 0. When the INF is 0, the charge control apparatus enters quick charge mode. The inhibition flag INF is set to 1 when the usual quick charge is completed, but set to 0 when the DC plug 6 is disconnected or when the battery pack 2 is removed. Accordingly, the necessity of the quick charge is decided upon whether or not the flag INF is 0.

In the quick charge mode, the microcomputer 34 switches the contact of the relay 30 from S1 to S2 by changing the signal H0 to be high and driving the relay driver 38, and increases the supply voltage from the line 41 up to 25 V by turning on the transistor Q1 of the constant voltage circuit 31 if the battery is open circuit. In addition, the microcomputer 34 turns on the transistors Q2 to Q4 by changing the signals T2 to T4 to be high to start a 0.2 C quick charge. Concurrent with the start of the quick charge, the operation of a safety timer 530 and a charger timer 531 are started. The potential of the line 42 turns to be the same potential as that of the battery 2.

After 0.2 C charge has been commenced, the microcomputer 34 judges the type of the battery on the basis of an input about a battery type detector switch delivered from the terminal P4. In the case of the Ni-Cd battery, the microcomputer changes the flag BATF to 0, and causes the red LED 370 to illuminate by driving the LED driver 390. In the case of Ni-MH battery, the microcomputer changes the flag BATF to 1, and causes the LEDs 370 and 371 to illuminate by driving the drivers 390 and 391 so as to allow the LED 37 to glow.

Figure 4A:
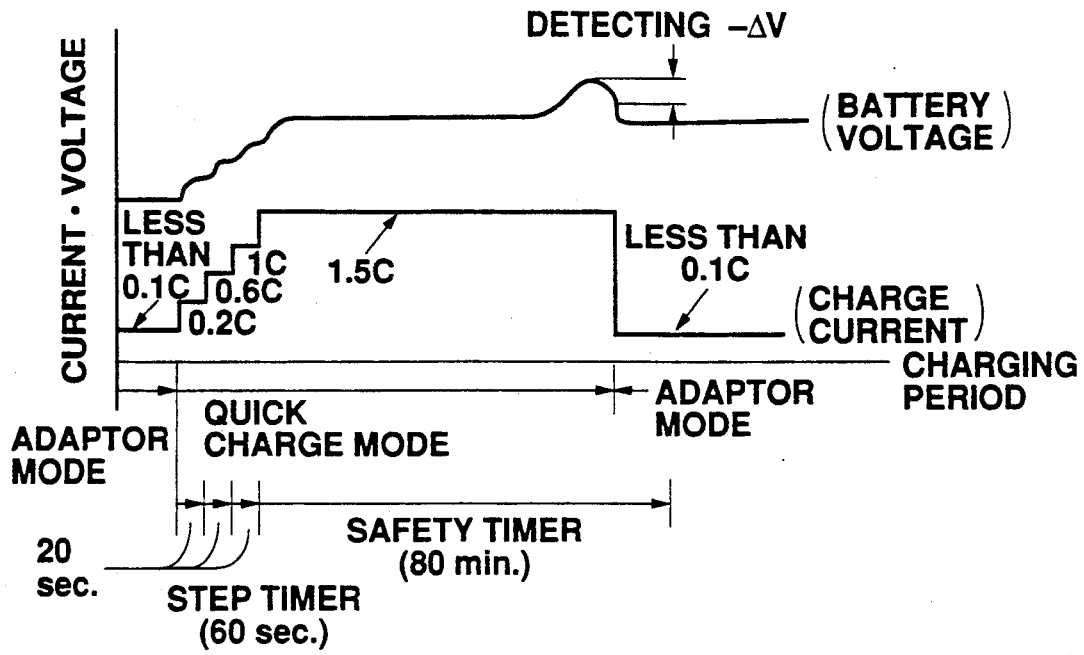
FIG. 4 is a diagrammatic representation of voltage waveforms and current waveforms produced in the quick charge control apparatus according to one embodiment of this invention.
Figure 6A:
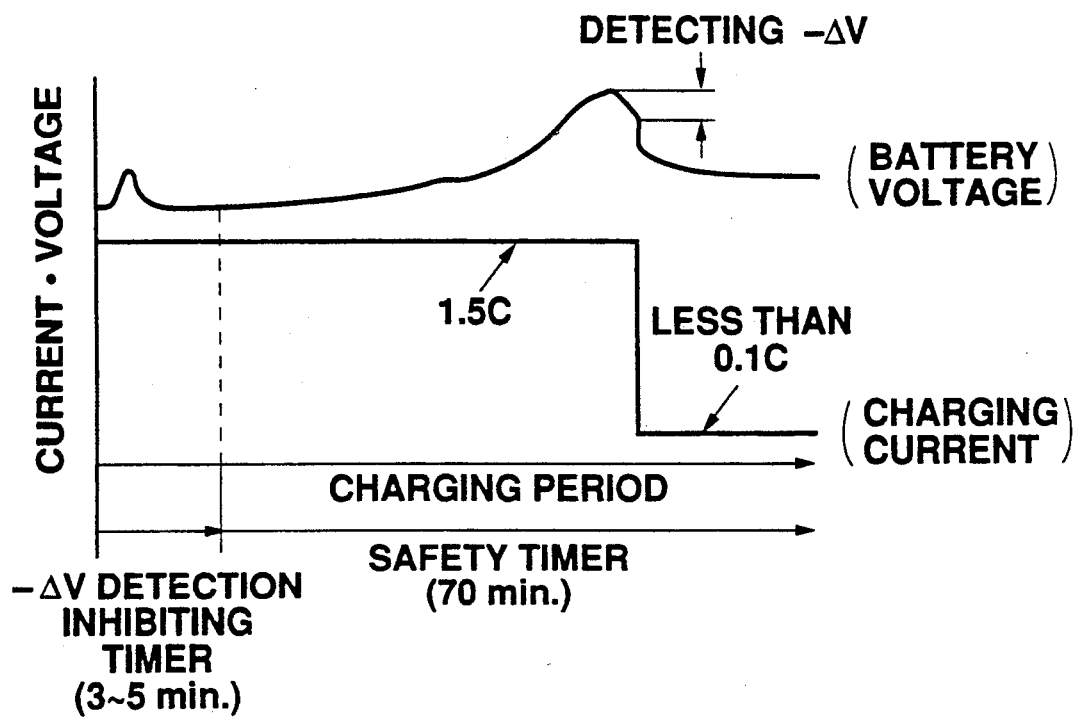
FIG. 6 is a diagrammatic representation of voltage waveforms and current waveforms produced in a conventional quick charge control apparatus.

The microcomputer 34 makes a judgment whether or not twenty seconds have passed from when the 0.2 C charge is started by the use of the charger timer, and the transistor Q2 is turned on by changing the signal T1 from high to low so as to increase the value of constant current up to 0.6 C if twenty seconds have already passed. Every elapsing of twenty seconds on the charge timer, the signals T2 and T3 are changed from low to high, and the constant current value is increased from 1 C to 1.5 C in steps, as shown in FIG. 4A. In accordance with the increase in the constant current value, a battery voltage BV shows a gradual increase as illustrated in FIG. 4A, and it will be understood that there arises no pseudo peak voltage which occurs in the prior art as shown in FIG. 6A because of the abrupt application of a large amount of current at the initial stage of charge. The suppression of pseudo peak voltage is more effectively achieved by increasing the number of steps in changing the constant current value.

During each cycle of the quick charge cycle between 0.1C and 0.5C, as designated by STEPs A, B and D, the connecting status of the DC plug, the status of open circuit battery, and the status of the main switch are always detected. In case the DC plug is disconnected, the battery is removed, or the main switch is turned on, the quick charge is ceased, and the LED 37 is turned off.

The microcomputer 34 stores a larger value in a RAM 52 as a PEEK value by effecting sampling of the battery voltage BV at a constant cycle and comparing a previously sampled value with a recently sampled value. If the recent sampled value is lower than the PEEK value, the microcomputer recognizes the occurrence of a peak voltage.

After the peak voltage has arisen, there is made a judgment whether or not a difference between the peak value and the most recent sampled battery voltage BV exceeds either the $\Delta V$ for the Ni-MH battery or the $\Delta V$ for the Ni-Cd battery which is advancedly stored in the ROM, and if the difference is beyond the $\Delta V$, the occurrence of the $-\Delta V$ is recognized.

The decision that either the $\Delta V$ for Ni-MH battery or the $\Delta V$ for Ni-Cd battery is used is made upon the status of BATF representative of the type of the battery. If the difference value continuously exceeds the $\Delta V$ for one minute on the $\Delta V$ timer, the battery is judged to be fully charged. Then the inhibition flag is changed to 1, and the quick charge is completed, as shown in FIG. 4A. Particularly, the AC adaptor/charger reenters the adaptor mode after having changed the signals T0 to be low, T1-T3 to be high, and the contact of the relay 30 to S1, and the trickle charge of the battery 2 is effected.

Elapsing of one minute is detected by utilizing the flag DELTA being set to 0 when no $-\Delta V$ occurs on the basis of the judgment of the DELTA status, the setting of DELTA to 1 when $-\Delta V$ arises, the start of the timer, and the judgment of one minute elapsing.

If no peak voltage or $-\Delta V$ is detected after eighty minutes have passed from the commencement of quick charge, a safety timer 530 ceases the quick charge.

During each charging cycle from 0.2C to 1.5C, the judgment whether or not the battery is abnormal, that is, short circuited is made upon the decision of whether the battery voltage BV is less than 10 V or not.

In detail, a short timer checks on whether or not the status in which the battery voltage BV is below 10 V lasts for more than thirty seconds. If this happens, the occurrence of short circuit battery is recognized to cease the quick charge, and the LED 37 is blinked in red in the case of the Ni-Cd battery, and blinked in green in the case of the Ni-MH battery dependent on the battery type in response to the flag BATF. The blinking of LED is terminated by disconnecting the DC plug or removing the battery.

Figure 1A:
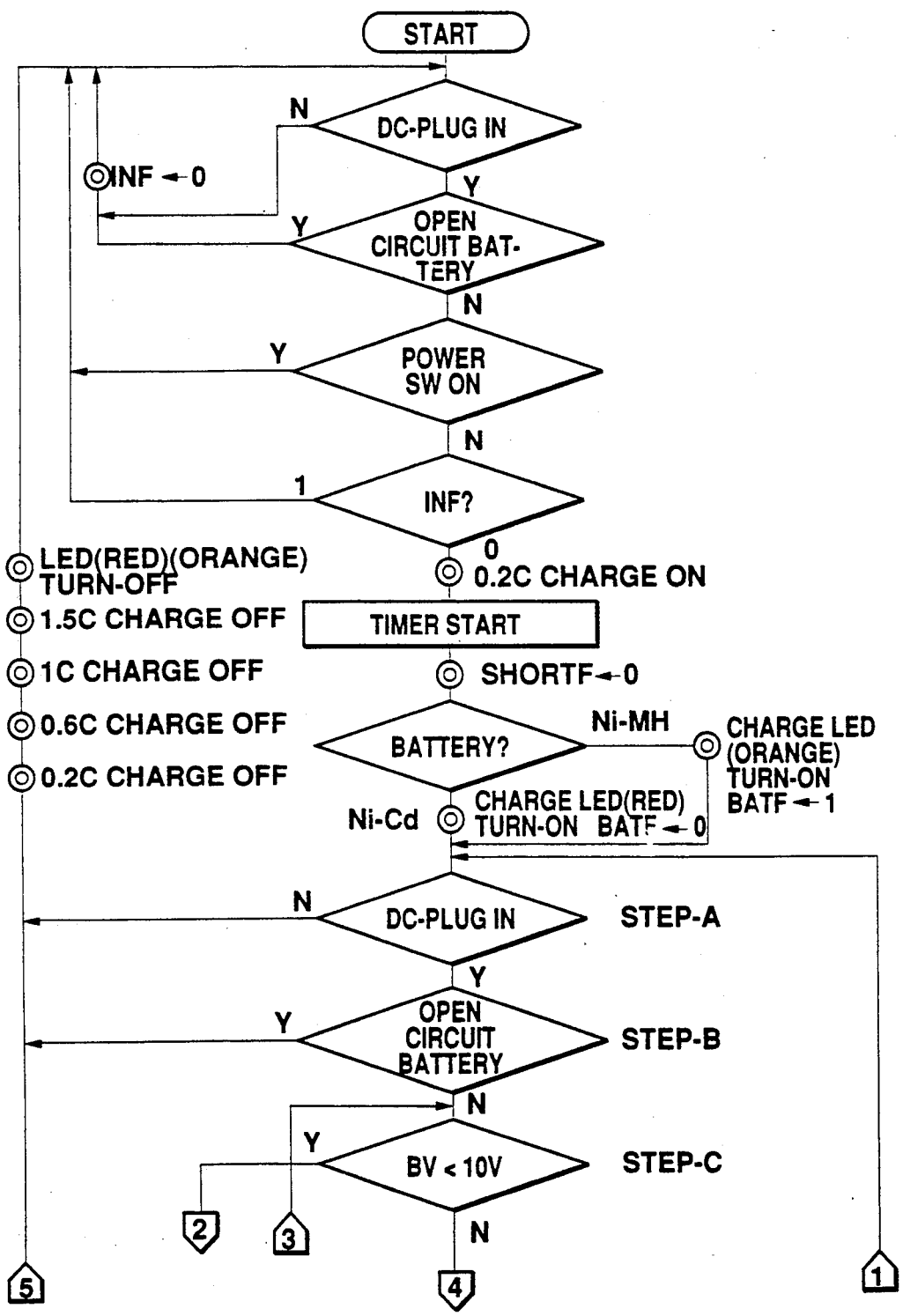
FIG. 1 is a flow chart showing the contents of processing steps in a quick charge control apparatus according to one embodiment of this invention.
Figure 1B:
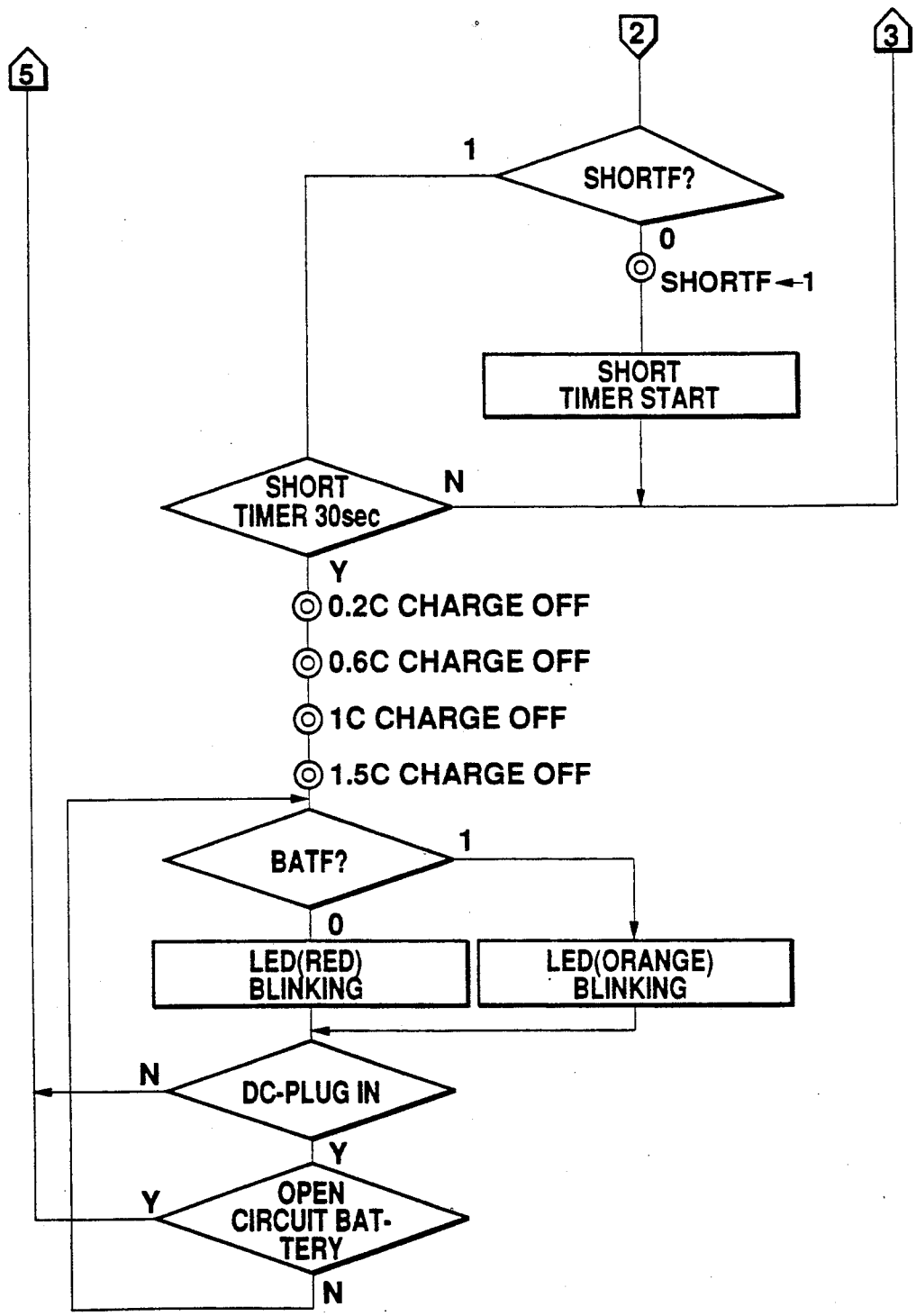
Figure 1C:
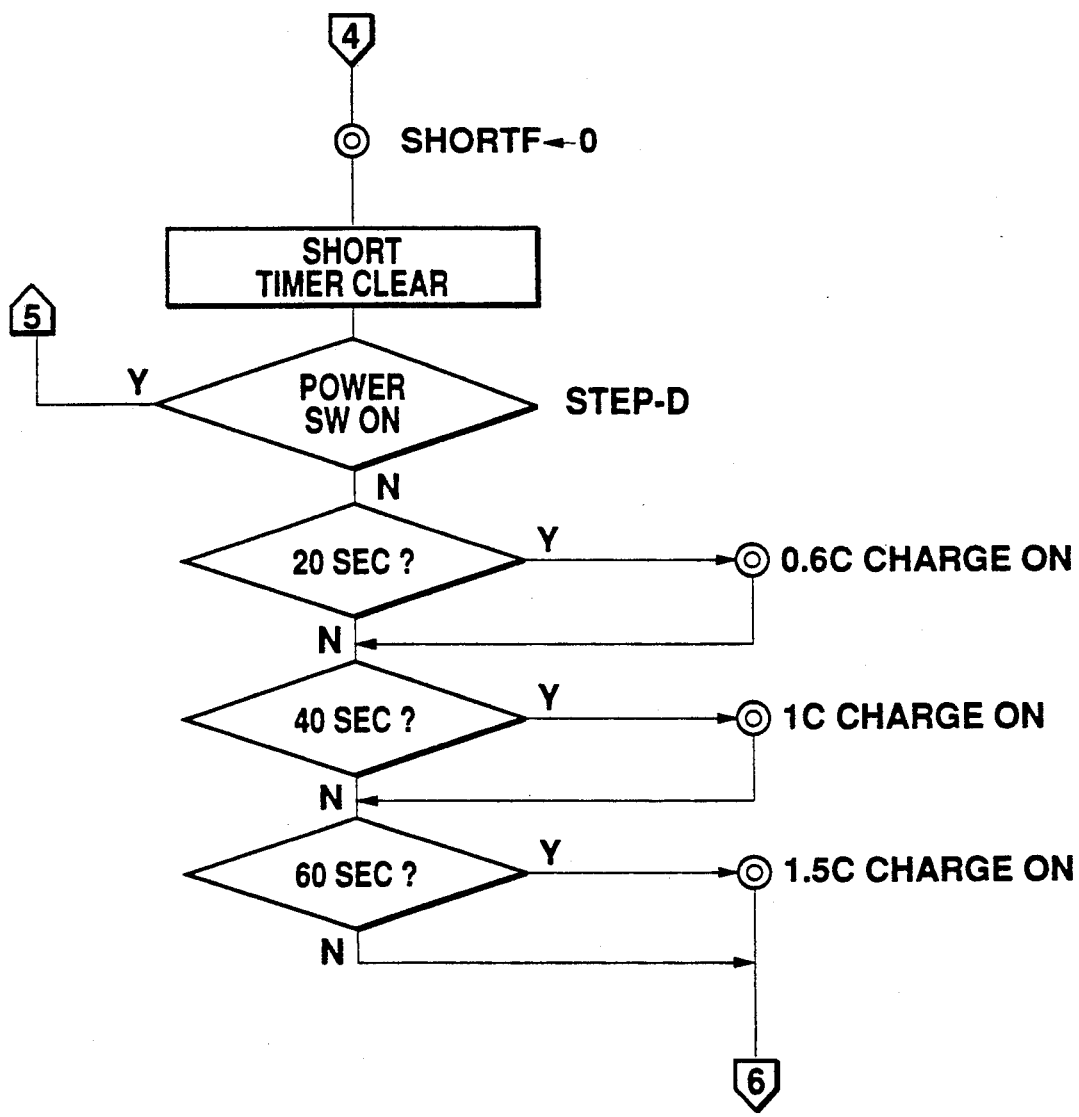
Figure 1D:
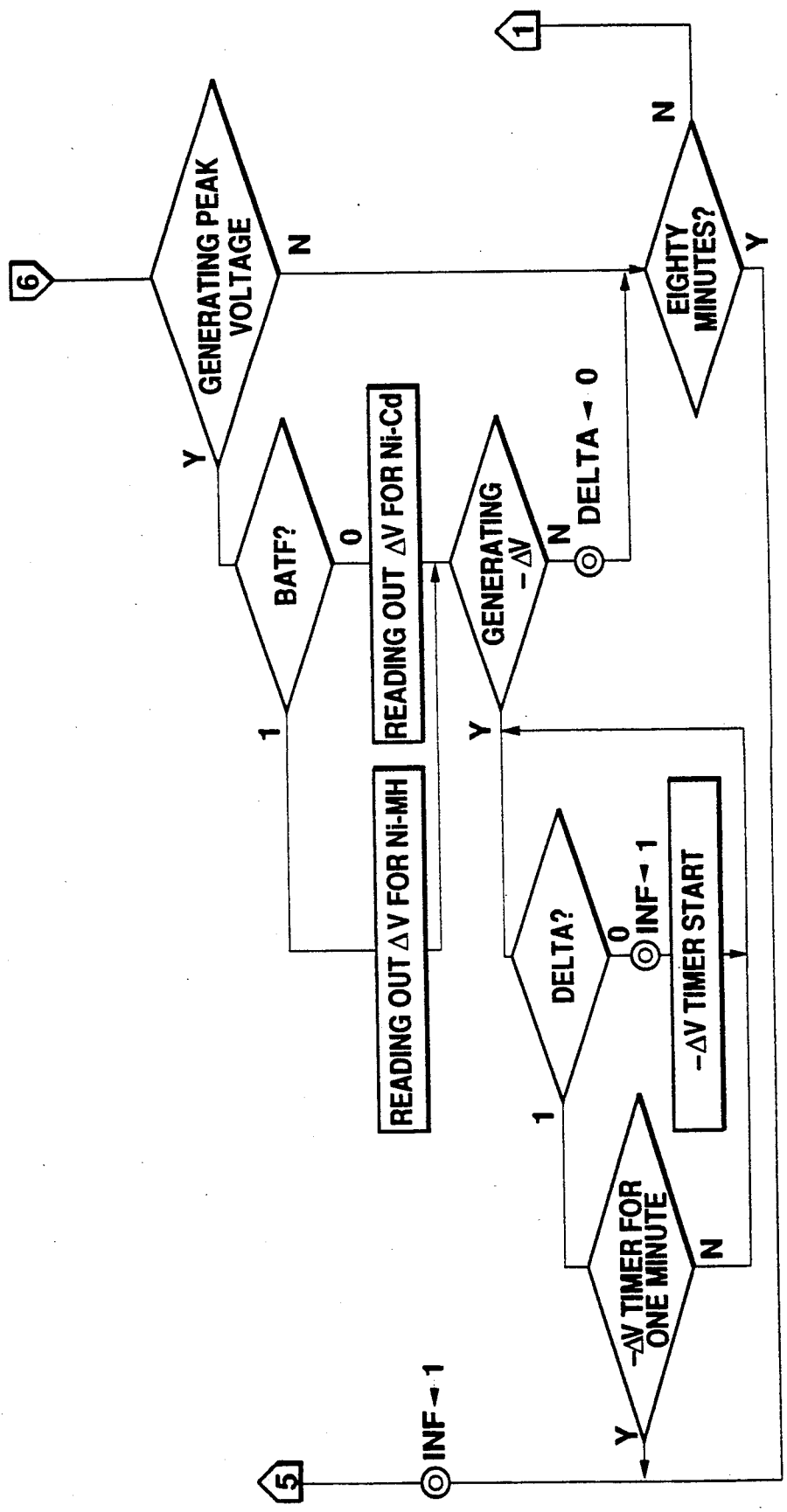

Upon completion of the quick charge cycle, the processing of the microcomputer 34 returns to the start of the flow chart shown in FIG. 1A. Then a judgment is made on the connection status of the DC plug and the status of the open circuit battery. If the DC plug is disconnected or the battery becomes open circuit, the same judgement is iterated by changing the inhibition flag INF to 0. If the DC plug is connected, and the battery is not open circuit, the status of the power switch and the inhibition flag INF are successively judged. If the power switch 9 is ON and the inhibition flag is 1, the processing returns to the start without changing the INF. The AC adaptor/charger enters quick charge mode only when the INF is 0.

This means that once the battery 2 has been charged by quick charge, the structure of the apparatus is designed to prevent inadvertent quick charge to be effected without removing either the DC plug or the battery 2. In other words, if the charge control apparatus is used with the DC plug disconnected after the quick charge, the quick charge is effected without fail by coupling the DC plug or replacing the battery with a new one with the DC plug connected.

Figure 4B:
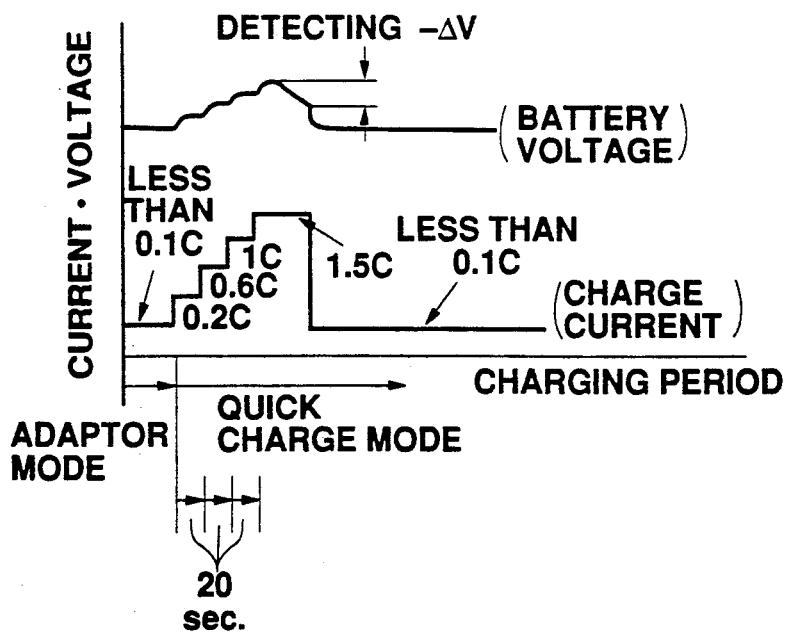
Figure 6B:
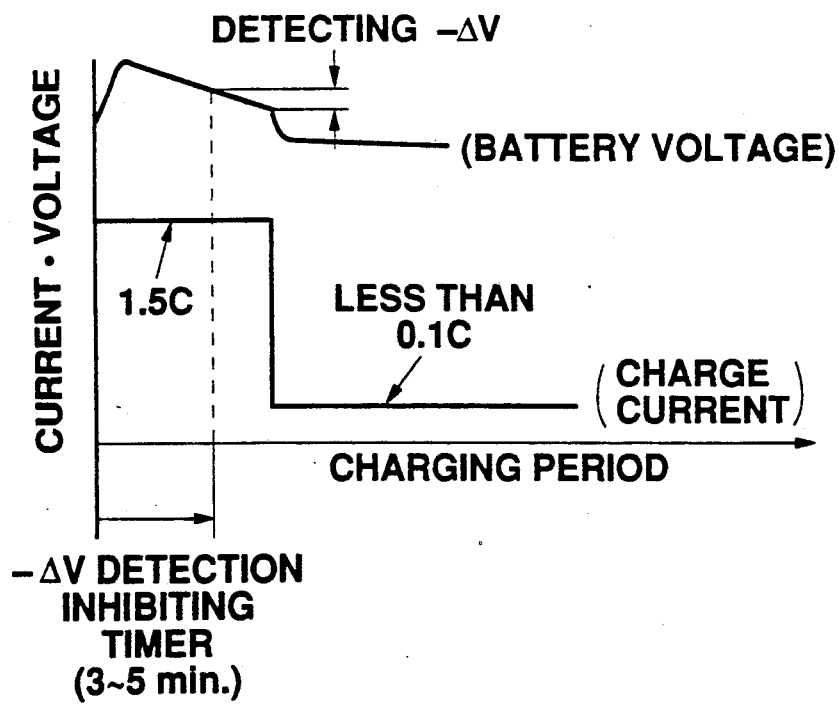

FIG. 4B shows an overcharged state in which an attempt is made to recharge the fully charged battery by the quick charge. According to this invention, since the charging current is gradually increased in steps in the initial stage of the quick charge as has been mentioned above, there occurs only gradual increase in the battery voltage. As a result, the increase in the temperature due to the charge can be suppressed as low as possible when compared with the conventional battery charger shown in FIG. 6B, thereby preventing the deterioration in the life of the battery.

Moreover, in the conventional apparatus, a 1.5C quick charge was necessarily continued for a few minutes determined by the $-\Delta V$ detector timer even though there occurs the peak voltage occurs. On the contrary, according to this invention, the charge can be completed by performing $-\Delta V$ detection in response to the occurrence of peak voltage except a waiting period for sixty seconds in the step charge mode. Thus, the period of overcharge is reduced, and it becomes possible to suppress the uprise in the temperature more than ever.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A charge control apparatus for use with electronic equipment having a main unit, the charge control apparatus comprising:
   (a) a power switch provided on the main unit of the electronic equipment and switchable between an ON state and an OFF state;
   (b) a secondary battery producing a voltage and situated in a removable fashion in the main unit of the electronic equipment;
   (c) a charging circuit having an output for supplying a charging current for quick charge to the secondary battery by use of an external power source;
   (d) first detector means for providing a signal indicating the state of the power switch;
   (e) second detector means for providing a signal indicating whether the secondary battery is situated in the main unit;
   (f) charge completion identifying means for providing a signal indicating that quick charge of the secondary battery has been completed;
   (g) flag control means for receiving signals from the second detector means and the charge completion identifying means, and causing a charge inhibition flag to be set when the quick charge is completed and to be reset when the secondary battery is removed;
   (h) flag status identifying means for providing a signal indicating whether the charge inhibition flag is set or reset; and
   (i) charge control means for controlling the charging circuit dependent on the signals from the first and the second detector means, the charge completion identifying means and the flag status identifying means, and the charge control means controlling the charging circuit in such a manner as to cause the charging circuit to commence the quick charge when the secondary battery is situated in the main unit, the power switch is off, and the charge inhibition flag is reset, and to cause the charging circuit to terminate the quick charge when the charge completion identifying means provides the signal indicating that quick charge of the secondary battery has been completed.

2. The quick charge control apparatus according to claim 1, wherein the second detector means includes means for detecting a voltage at the output of the charging circuit and comparing the voltage with a predetermined value to produce a comparison result, and the second detector means detects whether or not the secondary battery is situated in the main unit on the basis of the comparison result.

3. The quick charge control apparatus according to claim 1, wherein the identifying means supervises the voltage of the secondary battery and detects a drop in the voltage by a predetermined value from a maximum value.

4. A charge control system for use with electronic equipment having a main unit, the charge control system comprising:
   (a) a power switch provided on the main unit of the electronic equipment and switchable between an ON state and an OFF state;
   (b) a secondary battery producing a voltage and situated in a removable fashion in the main unit of the electronic equipment;
   (c) an adaptor for supplying electric power from an external power source to the main unit of the electronic equipment;
   (d) a charging circuit having an output for supplying a charging current for quick charge use to the secondary battery by the use of an external power source;
   (e) first detector means providing a signal indicating the state of the power switch;
   (f) second detector means for providing a signal indicating whether the secondary battery is situated in the main unit;
   (g) charge completion identifying means for providing a signal indicating that quick charge of the secondary battery has been completed;

(h) third detector means for providing a signal indicating whether detecting the adaptor is connected to the main unit of electronic equipment;

(i) flag control means for receiving signals from the second and third detector means and the charge completion identifying means, and causing a charge inhibition flag to be set when the quick charge is completed and to be reset when the secondary battery is removed or when the adaptor is removed;

(j) flag status identifying means for providing a signal indicating whether the charge inhibition flag is set or reset; and (k) charge control means for controlling the charging circuit dependent on the output of the first, second and third detector means and the status of the charge inhibition flag, and the charge control means controlling the charging circuit in such as manner as to cause the charging circuit to commence the quick charge when the secondary battery is situated in the main unit, the main power switch is off, the adaptor is connected to the main unit and the charge inhibition flag is reset, and to cause the charging circuit to terminate the quick charge when the charge completion identifying means provides the signal indicating that quick charge of the secondary battery has been completed.

5. The charge control system according to claim 4, wherein the second and the third detector means are composed of a single comparator means for detecting a voltage at the output of the charging circuit and comparing the voltage with a predetermined value to produce a comparison result, and the second and the third detector means detect the removal of the secondary battery and the disconnection of the adaptor from the main unit of the electronic equipment on the basis of the comparison result.

6. The charge control system according to claim 5, wherein the identifying means supervises the voltage of the secondary battery, and detects a drop in the voltage by a predetermined value from a maximum value.

7. The charge control system according to claim 4, wherein the charging circuit is provided in the same block where the adaptor is situated.

8. The charge control system according to claim 7, further comprising a switch for switching between a state for supplying power to the main unit of the electronic equipment from the adaptor and a state for supplying a quick charging current from the charging circuit, and wherein the charge control means controls the switching operation of the switch.

9. The charge control system according to claim 8, further comprising trickle charging means for supplying a micro charging current to the secondary battery with the adaptor supplying power to the main unit of the electronic equipment.

* * * * *